United States Patent
Cho et al.

(10) Patent No.: US 8,249,867 B2
(45) Date of Patent: Aug. 21, 2012

(54) MICROPHONE ARRAY BASED SPEECH RECOGNITION SYSTEM AND TARGET SPEECH EXTRACTING METHOD OF THE SYSTEM

(75) Inventors: Hoon Young Cho, Daejeon (KR); Yun Keun Lee, Daejeon (KR); Jeom Ja Kang, Daejeon (KR); Byung Ok Kang, Daejeon (KR); Kap Kee Kim, Daejeon (KR); Sung Joo Lee, Daejeon (KR); Ho Young Jung, Daejeon (KR); Hoon Chung, Gangwon (KR); Jeon Gue Park, Seoul (KR); Hyung Bae Jeon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 995 days.

(21) Appl. No.: 12/242,819

(22) Filed: Sep. 30, 2008

(65) Prior Publication Data

US 2009/0150146 A1   Jun. 11, 2009

(30) Foreign Application Priority Data

Dec. 11, 2007  (KR) .......................... 10-2007-0128096
Sep. 8, 2008   (KR) .......................... 10-2008-0088318

(51) Int. Cl.
   *G10L 15/20*   (2006.01)
(52) U.S. Cl. ........ 704/233; 704/228; 704/256; 704/222; 704/220; 381/94.1; 381/92; 381/94.3; 381/66

(58) Field of Classification Search .................. 704/233, 704/226–228, 208, 205, 240, 256, 222, 220, 704/275, 231; 381/92, 94.1, 94.2, 94.3, 66, 381/60, 122, 314, 88.01
See application file for complete search history.

(56) References Cited

U.S. PATENT DOCUMENTS

| | | | | |
|---|---|---|---|---|
| 5,828,997 | A * | 10/1998 | Durlach et al. | 704/233 |
| 6,879,952 | B2 * | 4/2005 | Acero et al. | 704/222 |
| 7,047,189 | B2 * | 5/2006 | Acero et al. | 704/222 |
| 7,478,041 | B2 * | 1/2009 | Ichikawa et al. | 704/233 |
| 7,533,015 | B2 * | 5/2009 | Takiguchi et al. | 704/205 |
| 7,562,013 | B2 * | 7/2009 | Gotanda et al. | 704/228 |
| 7,567,678 | B2 * | 7/2009 | Kong et al. | 381/92 |
| 7,720,679 | B2 * | 5/2010 | Ichikawa et al. | 704/233 |
| 7,895,038 | B2 * | 2/2011 | Nishimura et al. | 704/250 |
| 7,995,767 | B2 * | 8/2011 | Amada | 381/18 |
| 2001/0037195 | A1 * | 11/2001 | Acero et al. | 704/200 |
| 2003/0177007 | A1 * | 9/2003 | Kanazawa et al. | 704/233 |

(Continued)

OTHER PUBLICATIONS

Jen-Tzung Chien et al., "A New Independent Component Analysis for Speech Recognition and Separation," IEEE Transactions on Audio, Speech, and Language Processing, Jul. 2006, pp. 1245-1254, vol. 14, No. 4., IEEE.

*Primary Examiner* — Vijay B Chawan

(57) ABSTRACT

A microphone-array-based speech recognition system using a blind source separation (BBS) and a target speech extraction method in the system are provided. The speech recognition system performs an independent component analysis (ICA) to separate mixed signals input through a plurality of microphone into sound-source signals, extracts one target speech spoken for speech recognition from the separated sound-source signals by using a Gaussian mixture model (GMM) or a hidden Markov Model (HMM), and automatically recognizes a desired speech from the extracted target speech. Accordingly, it is possible to obtain a high speech recognition rate even in a noise environment.

16 Claims, 3 Drawing Sheets

U.S. PATENT DOCUMENTS

| | | | |
|---|---|---|---|
| 2004/0220800 A1* | 11/2004 | Kong et al. | 704/205 |
| 2005/0091042 A1* | 4/2005 | Acero et al. | 704/205 |
| 2007/0005350 A1* | 1/2007 | Amada | 704/211 |
| 2007/0100615 A1* | 5/2007 | Gotanda et al. | 704/226 |
| 2008/0120100 A1* | 5/2008 | Takeda et al. | 704/233 |
| 2009/0055170 A1* | 2/2009 | Nagahama | 704/226 |

* cited by examiner

MICROPHONE ARRAY BASED SPEECH RECOGNITION SYSTEM AND TARGET SPEECH EXTRACTING METHOD OF THE SYSTEM

CROSS-REFERENCE TO RELATED APPLICATIONS

This application claims the priority of Korean Patent Application Nos. 2007-0128096 filed on Dec. 11, 2007 and 2008-0088318 filed on Sep. 8, 2008 in the Korean Intellectual Property Office, the disclosure of which is incorporated herein by reference.

BACKGROUND OF THE INVENTION

1. Field of the Invention

The present invention relates to a speech recognition system and a target speech extraction method of the system, and more particularly, to a microphone-array-based speech recognition system using a blind source separation (BSS) scheme and a target speech extraction method in the system.

This work was supported by the IT R&D program of MIC/IITA [2006-S-036-02, Development of large vocabulary/interactive distributed/embedded VUI for new growth engine industries]

2. Description of the Related Art

Recently, in a speech recognition technology, tens of thousand words can be recognized with a high speech recognition rate of 95% or more in a silent environment. However, in an actual environment where various types of noise exist, the speech recognition rate is drastically decreased. Therefore, for commercialization of the speech recognition technology, it is necessary to obtain a higher speech recognition rate even in an actual environment.

In addition, various noise processing methods for pre-processing, recognition, and post-processing stages of speech recognition have been researched and developed. However, a method adapted for all kinds of noise has not been developed.

In addition, microphone-array-based blind source separation (hereinafter, referred to as BSS) methods capable of separating speech signals by using two or more microphones have been actively researched. As an important method among the BSS methods, there is an independent component analysis (hereinafter, referred to as ICA). According to the ICA technology, interference signals or noises originated from a neighboring speaker, a TV, or a radio around a speech input apparatus such as a speech recognition unit, a telephone, and a mobile phone can be effectively reduced or removed. That is, in a case where N sound sources including an input speech and M microphones exist, if the numbers M and N are approximately equal to each other, the N sound-source signals can be recovered from the M microphone input signals.

However, the ICA technology has a problem in that the order of the N sound-source signals separated by using the ICA may be arbitrarily changed.

In a conventional ICA technology, the mixed signals are generated by multiplying the sound-source signals with arbitrary weighting factors in a time domain and adding the weighted sound-source signals, and speech recognition is performed by extracting the original sound-source signals from the mixed signal. Recently, due to development of the ICA technology, the original sound source signals can be extracted even in a case where reverberating sounds actually exist in a room.

However, in the recent ICA technology, a method of automatically identifying sources from which the separated sound-source signals are originated cannot be developed. Therefore, in order to perform the speech recognition, a target speech which is to be input to a speech recognition system is needed to be automatically identified.

SUMMARY OF THE INVENTION

The present invention provides a microphone-array-based speech recognition system capable of automatically identifying a desired target speech by using a microphone-array-based blind source separation (BSS) scheme for speech recognition and a target speech extraction method in the speech recognition system.

According to an aspect of the present invention, there is provided a microphone-array-based speech recognition system comprising: a signal separator which separates mixed signals input through a plurality of microphone into sound-source signals by an ICA; a target speech extractor which extracts one target speech spoken for speech recognition from the sound-source signals separated by the signal separator; and a speech recognition unit which recognizes a desired speech from the extracted target speech.

According to another aspect of the present invention, there is provided a target speech extraction method in a microphone-array-based speech recognition system, comprising: separate mixed signals input through a plurality of microphone into sound-source signals by an ICA; extracting one target speech spoken for speech recognition from the separated sound-source signals; and recognizing a desired speech from the extracted target speech.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENT

Hereinafter, embodiments of the present invention will be described in detail with reference to the accompanying drawings. For clarifying the present invention, detailed description of well-known functions and constructions will be omitted.

A speech recognition technology according to the present invention is a blind source separation (BSS) technique and a pre-processing technology for speech recognition in a noise environment in a microphone-array-based signal processing field. Recently, an independent component analysis (ICA) technique associated with the BSS has been developed. According to the ICA technology, sound sources can be successfully separated by using two or more microphones. The ICA technology is expected to be adapted to various applications such an acoustic signal separation, a multi-channel brainwave signal separation, and an image pattern analysis.

Now, a microphone-array-based speech recognition system for target speech extraction using the BSS will be described in detail with reference to the accompanying drawings.

Figure 1:
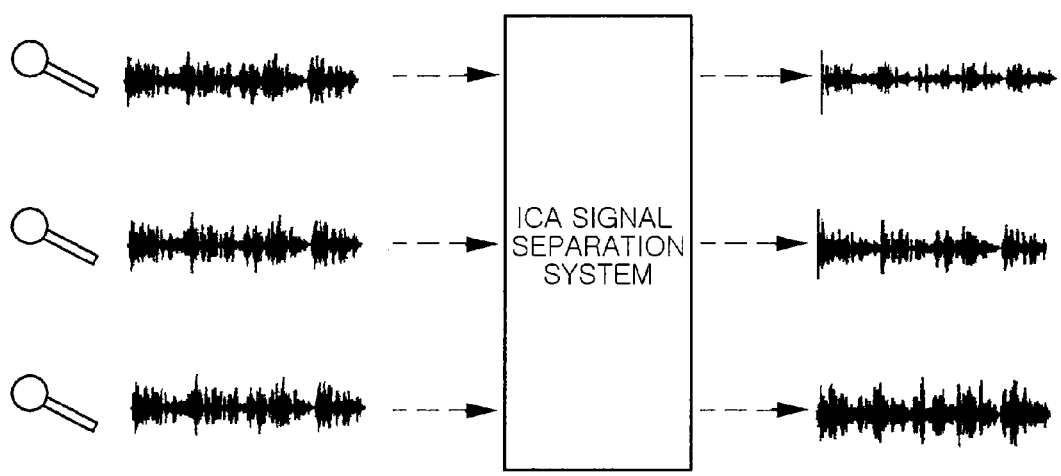
FIG. 1 is a block diagram illustrating a signal separation system using a general ICA technology.
Figure 2:
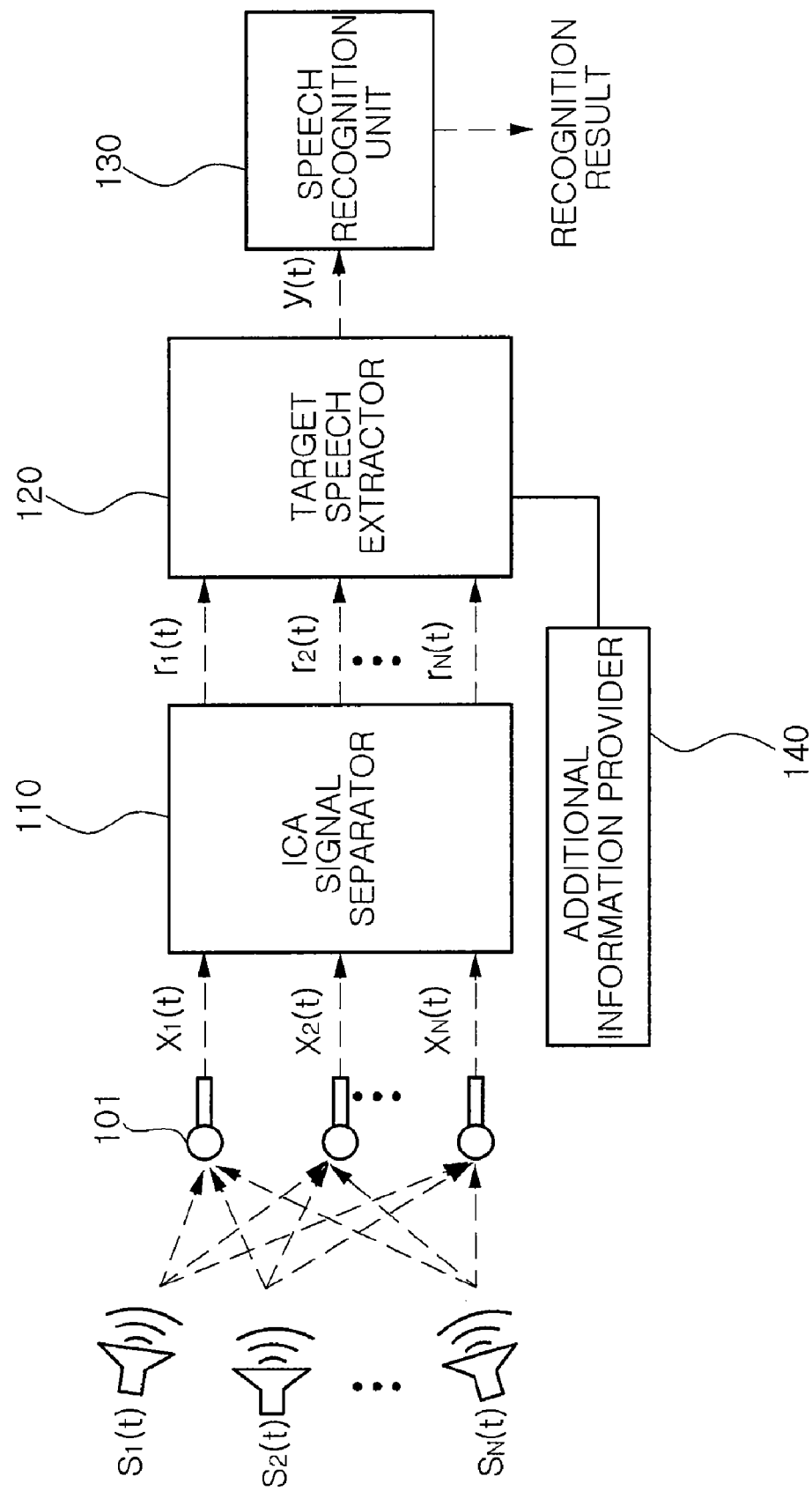
FIG. 2 is a block diagram illustrating a configuration of a microphone-array-based speech recognition system for target speech extraction according to an embodiment of the present invention.

FIG. 2 is a block diagram illustrating a configuration of the microphone-array-based speech recognition system for target speech extraction according to an embodiment of the present invention.

Referring to FIG. 2, the speech recognition system may include a plurality of microphones 101, a signal separator 110, a target speech extractor 120, a speech recognition unit 130, and an additional information provider 140.

Each of the microphones 101 receives a mixed signal of sound-source signals $S_1(t), S_2(t), \ldots,$ and $S_N(t)$.

The signal separator 110 is input with mixed signals $X_1(t), X_2(t), \ldots,$ and $X_N(t)$ output from the microphones 101 and performs the ICA to separate each of the mixed signals into separated sound-source signals $r_1(t), r_2(t), \ldots,$ and $r_N(t)$.

The target speech extractor 120 is input with the separated sound-source signals and extracts a target speech from the sound-source signals. For example, the target speech extraction is implemented by extracting features of N separated sound-source signals, calculating logarithm likelihood ratio (LLR)-based reliabilities using a Gaussian mixture model (GMM), comparing the reliabilities, and determining the target speech. The target speech extraction of the target speech extractor 120 may be classified into two types of target speech extraction according to whether or not additional information is provided from the additional information provider 140. In addition, the target speech extraction of the target speech extractor 120 may be performed by taking into consideration information representing that the target speech is a male (or female) speech and other sound sources are speech from the other gender or all the other signals except for a male's speech, information representing that all the other separated signals excluding the target speech are noise signals, and information representing that the target speech is a speech of a specific speaker.

In a case where the additional information is provided, the target speech extractor 120 determines as the target speech a sound source having the highest reliability obtained through a hypothesis test for the sound-source signals by using the GMM. In a case where the additional information is not provided, the target speech extractor 120 calculates reliabilities of the sound sources by using a hidden Markov model (HMM) embedded in the speech recognition system.

The speech recognition unit 130 receives the extracted target speech signal y(t) to recognize a desired speech.

Now, a target speech extraction method of the speech recognition system having the aforementioned configuration will be described in detail with reference to the accompanying drawings.

Figure 3:
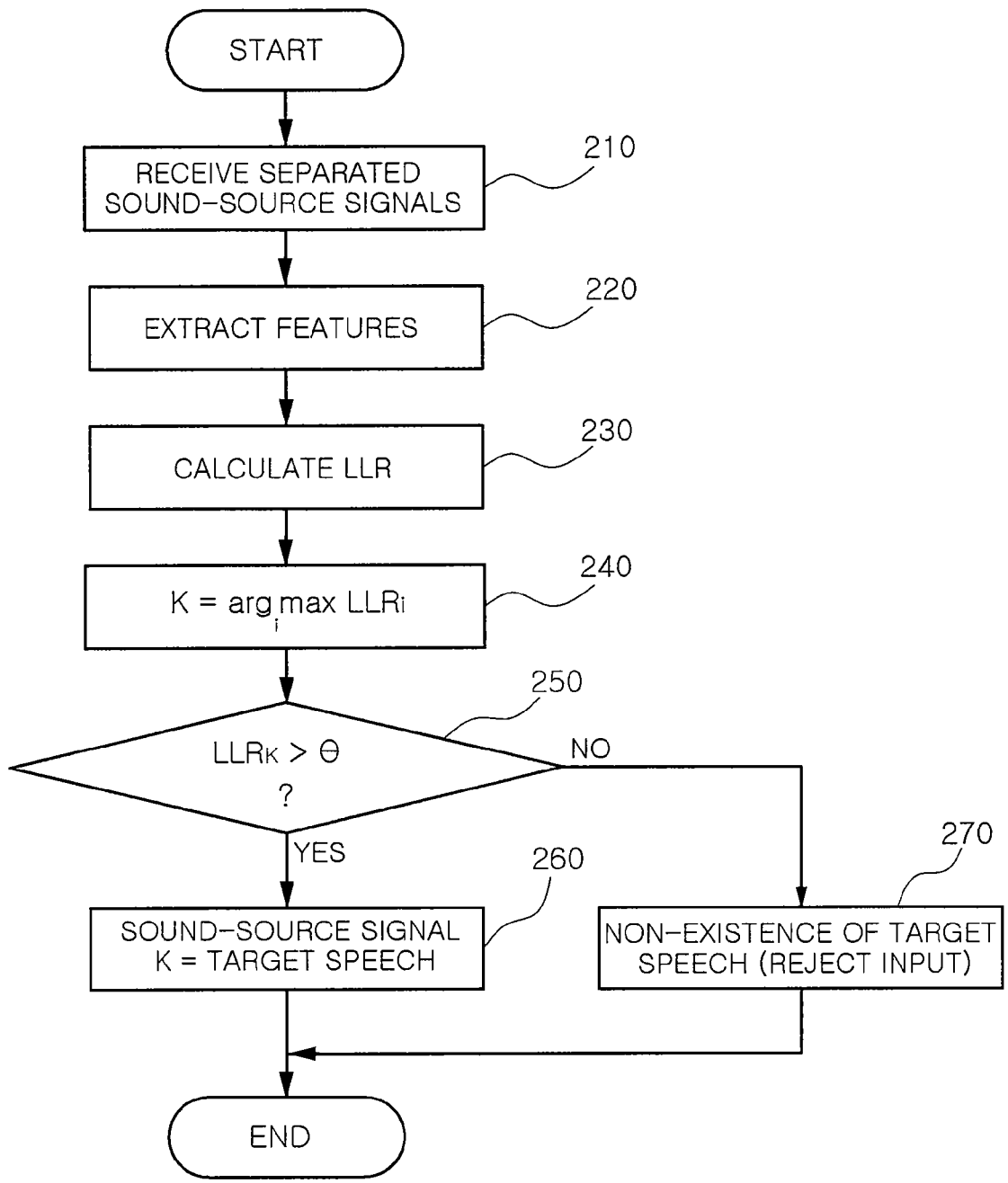
FIG. 3 is a flowchart of a target speech extraction method by using a target speech extractor of the microphone-array-based speech recognition system according to the embodiment of the present invention.

FIG. 3 is a flowchart of the target speech extraction method by using the target speech extractor 120 of a microphone-array-based speech recognition system according to an embodiment of the present invention.

Referring to FIG. 2, in operation 210, the target speech extractor 120 is input with N separated sound-source signals from the signal separator 110.

Next, in operation 220, in a case where the N separated sound-source signals are 8 kHz or 16 kHz sound-source signals, the target speech extractor 120 calculates N-th order feature vectors $x_t$ in a 20 ms-interval frame every 10 ms of an audio signal in order to extract features of the N separated sound-source signals. As a method of calculating the feature vectors, various methods including a linear prediction cepstral coefficient (LPCC) method, a perceptual linear prediction (PLP) method, and a Mel-frequency cepstral coefficient (MFCC) method may be used.

In operation 230, the target speech extractor 120 calculates LLR-based reliabilities of the extracted features using the GMM. The GMM is a statistics modeling method for modeling an N-dimensional vector space with M multivariate Gaussian distributions, which is widely used in a speech recognition unit or a speaker recognition apparatus. In an arbitrary GMM, an m-th Gaussian distribution can be expressed by the following Equation 1.

$$N(x; \mu_m, \Sigma_m) = \frac{1}{\sqrt{(2\pi)^n |\Sigma|}} e^{-\frac{1}{2}(x-\mu_m)' \Sigma_m (x-\mu_m)} \quad \text{[Equation 1]}$$

In Equation 1, x denotes a feature vector, and $\mu_m$, and $\Sigma_m$ denote an average vector and a covariance matrix of an m-th Gaussian distribution. A sequence of N-dimensional feature vectors in T frames that covers all the intervals of the audio signal is denoted by $X=[x_1, x_2, \ldots, x_T]$, and if the neighboring feature vectors are independent, a GMM output probability can be expressed by the following Equation 2.

$$P(X) = \prod_{t=1}^{T} P(x_t) \quad \text{[Equation 2]}$$
$$= \prod_{t=1}^{T} \sum_{m=1}^{M} \alpha_m \cdot N(x_t; \mu_m, \Sigma_m)$$

The GMM parameters such as $\mu_m$ values and $\Sigma_m$ values can be obtained from a training database using well-known maximum likelihood prediction algorithm or the like. $\alpha_m$ represents the weight (or the contribution) of m-th Gaussian distribution among M Gaussian distributions and $$\sum_{m=1}^{M} \alpha_m = 1.$$

Next, in operation 240, the target speech extractor 120 calculate an argument k (sometimes, referred to as a maximum argument k) that correspond to the maximum LLR among the LLRs. If LLRK>θ in operation 250, the target speech extractor 120 determines the separated sound-source signal K as the target speech in operation 260. If not, the target speech extractor 120 determines an absence of target speech, that is, input rejection in operation 270.

As described above, operations 230 to 270 of the target speech extraction method may be performed by taking into consideration several cases. For example, the target speech extraction method may be implemented for several cases such as a case of using gender information, a case of using speech-music information, a case of using speech-noise information, a case of using speaker's personal information, and a case of no additional information. Now, the target speech extraction methods for the several cases will be described in detail.

In the first case of using the gender information, that is, in a case where information representing that a sound source of a target speech is a female speech and the other sound sources are a male speech or the other types of audio signals is provided, the target speech extraction method is performed as follows.

Firstly, speech database is divided to male speech data and female speech data to generate $\lambda_{Male}$ and $\lambda_{Female}$ according to the GMM.

Next, feature vector sequences extracted from N separated sound-source signals are denoted by $X^1, X^2, \ldots,$ and $X^N$ ($X^i=[x_1^i, x_2^i, \ldots, x_T^i]$), and the LLRs $LLR_i$ of the feature vector sequence $x^i$ for the $\lambda_{Male}$ and $\lambda_{Female}$ are calculated by using the following Equation 3.

$$LLR_i = \log\frac{P(X^i|\lambda_{Female})}{P(X^i|\lambda_{Male})} \quad \text{[Equation 3]}$$

If the i-th sound source $x^i$ is a female speech, the numerator term in Equation 3 has a larger value, so that the $LLR_i$ has a higher value. If not, the $LLR_i$ has a lower value.

The maximum argument k corresponding to the maximum LLR among all the $LLR_i$ can be calculated by using the following Equation 4.

$$k = \underset{i}{\mathrm{argmax}} LLR_i \quad \text{[Equation 4]}$$

In operation 250, the maximum LLR ($LLR_k$) corresponding to the maximum argument k is compared with a predetermined threshold value θ. If the maximum LLR ($LLR_k$) is larger than the threshold value θ, the target speech extractor 120 determines the k-th sound source $X^k$ as the target speech and outputs the $X^k$ to the speech recognition unit 130. If the maximum LLR ($LLR_k$) is smaller than the threshold value θ, the target speech extractor 120 determines that there is no target speech in the separated speech signals. The threshold value θ is calculated as $\theta = T \cdot \theta_{norm}$, where T is the number of frames and $\theta_{norm}$ is a normalized threshold that is predetermined according to each specific case.

In a case where information representing that a target speech is a male sound source and the other sound sources are a female sound source or the other types of audio signals is provided, the LLRs $LLR_i$ are calculated by using the following Equation 5, and the other processes are the same as those of the case where the target speech is a female sound source.

$$LLR_i = \log\frac{P(X^i|\lambda_{Male})}{P(X^i|\lambda_{Female})} \quad \text{[Equation 5]}$$

In the second case of using the speech-music information, that is, in a case where information representing that a target speech is a speech source and the other sound sources are music signals is provided, the target speech extraction method is performed as follows.

Firstly, database is divided into speech data and music data to generate $\lambda_{Speech}$ and $\lambda_{Music}$ according to the GMM.

Next, the LLRs $LLR_i$ of the feature vector sequence $x^i$ are calculated by using the following Equation 6.

$$LLR_i = \log\frac{P(X^i|\lambda_{Speech})}{P(X^i|\lambda_{Music})} \quad \text{[Equation 6]}$$

Subsequent processes for the target speech extraction method are the same as those of the first case, and thus, detailed description thereof is omitted.

In the third case of using the speech-noise information, that is, in a case where information representing that a target speech is a speech source and the other sound sources are noise signal is provided, the target speech extraction method is performed as follows.

Firstly, database is divided into speech data and noise data to generate $\lambda_{Speech}$ and $\lambda_{Noise}$ according to the GMM.

Next, feature vector sequences extracted from the N separated sound-source signals are denoted by $X^1, X^2, \ldots,$ and $X^N$, and the LLRs $LLR_i$ of the feature vector sequence $X^i$ for the $\lambda_{Speech}$ and $\lambda_{Noise}$ are calculated by using the following Equation 7.

$$LLR_i = \log\frac{P(X^i|\lambda_{Speech})}{P(X^i|\lambda_{Noise})} \quad \text{[Equation 7]}$$

Subsequent processes for the target speech extraction method are the same as those of the first case, and thus, detailed description thereof is omitted.

In the fourth case using the speaker's personal information of a specific speaker, that is, in a case where information representing that sound source of a target speech is a speech of a known specific speaker and the other sound sources are speech of other speakers or the other types of audio signals is provided, the target speech extraction method is performed as follows.

Firstly, database is divided into specific speaker's speech data and other audio signal data to generate $\lambda_{Individual}$ and $\lambda_{Others}$ according to the GMM.

Next, feature vector sequences extracted from the N separated sound-source signals are denoted by $X^1, X^2, \ldots,$ and $X^N$, and the LLRs $LLR_i$ of the feature vector sequence $X^i$ for the $\lambda_{Individual}$ and $\lambda_{Others}$ are calculated by using the following Equation 8.

$$LLR_i = \log\frac{P(X^i|\lambda_{Individual})}{P(X^i|\lambda_{Others})} \quad \text{[Equation 8]}$$

Subsequent processes for the target speech extraction method are the same as those of the first case, and thus, detailed description thereof is omitted.

Subsequent processes for the target speech extraction method are the same as those of the first case, and thus, detailed description thereof is omitted.

In the fifth case of using no additional information, that is, in a case were additional information for the target speech is not particularly provided, it is assumed that a signal which is spoken for speech recognition exists in N separated sound-source signals, the LLR-based reliability is calculated by using an HMM as speech-recognition acoustic model. The reliability can be calculated as follows.

Firstly, primary speech recognition is performed on the separated sound-source signals by using the HMM of a speech recognition unit 130. The HMM acoustic models for a sequence of words obtained as a result of the primary speech recognition are aligned.

If the feature vector sequence of an i-th sound source is denoted by $X^i=[x_1^i, x_2^i, \ldots, x_T^i]$, an HHM state corresponding to the $x_t^i$ is denoted by $s_j^m$. Here, m and j denote an m-th HMM subword model and a j-th state thereof. Next, the LLRs $LLR_i$ are calculated by using the following Equation 9.

$$LLR_i = \log \frac{P(X^i | W)}{P(X^i | \overline{W})}$$ [Equation 9]

$$= \log \frac{\prod_t P(x_t^i | s_j^m)}{\prod_t P(x_t^i | \overline{s}_j^m)}$$

$$= \sum_t \log \frac{P(x_t^i | s_j^m)}{P(x_t^i | \overline{s}_j^m)}$$

$$\cong \sum_t [\log P(x_t^i | s_j^m) - \log \left[ \frac{1}{K-1} \sum_{\substack{k=1 \\ k \neq m}}^{K} \exp(\gamma \log P[x_t^i | s_j^k]) \right]^{1/\gamma} ]$$

In Equation 9, w denotes a sequence of the words obtained from the speech recognition unit 130, $\overline{w}$ is a complement of the w, and $\overline{s}_j^m$ is a complement of the $s_j^m$. Since the $\overline{s}_j^m$ is difficult to directly and practically obtain, an approximate value of the $\overline{s}_j^m$ can be predicted as shown in the last line of Equation 9. K is the number of the states included in all the HMMs corresponding to $\overline{w}$. γ is a constant term which can be determined experimentally. If γ is set very large, the second summation term in the last line of equation 9 is dominated by the largest likelihood value. As γ gets smaller, the contribution of the other likelihoods become more significant. Subsequent processes for the target speech extraction method are the same as those of the first case, and thus, detailed description thereof is omitted.

In the final case using information representing that sound source of a target speech is a speech with a specific property A and the other sound sources are audio signals of specific property B, the target speech extraction method is performed as follows.

Firstly, database is divided into speech data having a specific property A and other audio signal data with a specific property B to generate $\lambda_{property\_A}$ and $\lambda_{property_{13}B}$ according to the GMM training method.

Next, feature vector sequences extracted from the N separated sound-source signals are denoted by $X^1, X^2, \ldots,$ and $X^N$, and the LLRs $LLR_i$ of the feature vector sequence $X^i$ for the $\lambda_{property\_A}$ and $\lambda_{property\_B}$ are calculated by using the following Equation 10.

$$LLR_i = \log \frac{P(X^i | \lambda_{Property\_A})}{P(X^i | \lambda_{Property\_B})}$$ [Equation 10]

According to the present invention, one target speech which is spoken for speech recognition can be recognized among sound-source signals separated through an ICA technology by using HMMs or GMMs. Accordingly, it is possible to perform the speech recognition with a high speech recognition rate even in a noise environment.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A microphone-array-based speech recognition system comprising:
   a signal separator configured to separate mixed signals input through a plurality of microphone into sound-source signals by an ICA algorithm;
   a target speech extractor configured to extract one target speech spoken for speech recognition from the sound-source signals separated by the signal separator; and
   a speech recognition unit configured to recognize a desired speech from the extracted target speech,
   wherein the target speech extractor is configured to extract feature vector sequences from the separated sound-source signals, calculate logarithm likelihood ratios (LLRs) of the extracted feature vector sequences, calculate a maximum value by using the calculated LLRs, compare the maximum value with a predetermined threshold value, and determine the maximum value to be the target speech if the maximum value is larger than the threshold value.

2. The microphone-array-based speech recognition system of claim 1, further comprising an additional information provider configured to transmit additional information used for extraction of the target speech to the target speech extractor.

3. The microphone-array-based speech recognition system of claim 2, wherein, in a case where the additional information is provided, the target speech extractor is configured to perform a hypothesis test for the separated sound-source signals by using a Gaussian mixture model (GMM), and to determine a sound-source signal having the highest reliability as the target speech.

4. The microphone-array-based speech recognition system of claim 3, wherein the additional information is gender information, speech-music information, speech-noise information, or speaker's identification information.

5. The microphone-array-based speech recognition system of claim 1, wherein the target speech extractor is configured to determine that the target speech does not exist in the separated sound-source signals if the maximum value is smaller than the threshold value.

6. The microphone-array-based speech recognition system of claim 1, wherein, in a case where the additional information for the target speech is not provided, the target speech extractor is configured to calculate an LLR-based reliability by using a hidden Markov model (HMM) as a speech-recognition acoustic model.

7. A target speech extraction method for a microphone-array-based speech recognition system, comprising:
   separating mixed signals input through a plurality of microphone into sound-source signals by an ICA;
   extracting one target speech spoken for speech recognition from the separated sound-source signals; and
   recognizing a desired speech from the extracted target speech,
   wherein the extracting of the target speech comprises:
   extracting feature vector sequence $X^i$ from the separated sound-source signals;
   calculating an ith LLR (logarithm likelihood ratio) $LLR_i$ of the extracted feature vector sequence;
   calculating a maximum value using the $LLR_i$;
   comparing the maximum value with a predetermined threshold value; and
   determining the maximum value to be the target speech when the maximum value is larger than the threshold value.

8. The target speech extraction method of claim 7, further comprising determining that the target speech does not exist in the separated sound-source signals when the maximum value is smaller than the threshold value.

9. The target speech extraction method of claim 7, wherein, when additional information representing that the target speech is a female speech is provided, the $LLR_i$ is calculated as expressed by $$LLR_i = \log\frac{P(X^i \mid \lambda_{Female})}{P(X^i \mid \lambda_{Male})}$$

by applying pre-generated male and female GMMs (Gaussian mixture models) $\lambda_{Male}$ and $\lambda_{Female}$ to the extracted feature vector sequence $X^i$.

10. The target speech extraction method of claim 7, wherein, when additional information representing that the target speech is a male speech is provided, the $LLR_i$ is calculated as expressed by $$LLR_i = \log\frac{P(X^i \mid \lambda_{Male})}{P(X^i \mid \lambda_{Female})}$$

by applying pre-generated male and female GMMs $\lambda_{Male}$ and $\lambda_{Female}$ to the extracted feature vector $X^i$.

11. The target speech extraction method of claim 7, wherein, when additional information representing speech-music information is provided, the $LLR_i$ is calculated as expressed by $$LLR_i = \log\frac{P(X^i \mid \lambda_{Speech})}{P(X^i \mid \lambda_{Music})}$$

by applying GMMs $\lambda_{speech}$ and $\lambda_{Music}$ generated based on the speech-music information to the extracted feature vector sequence $X^i$.

12. The target speech extraction method of claim 7, wherein, when additional information representing speech-noise information is provided, the $LLR_i$ is calculated as expressed by $$LLR_i = \log\frac{P(X^i \mid \lambda_{Speech})}{P(X^i \mid \lambda_{Noise})}$$

by applying GMMs $\lambda_{speech}$ and $\lambda_{Noise}$ generated based on the speech-noise information to the extracted feature vector sequence $X^i$.

13. The target speech extraction method of claim 7, wherein, when additional information representing that the target speech is a speech of a specific speaker is provided, calculating the $LLR_i$ is calculated as expressed by $$LLR_i = \log\frac{P(X^i \mid \lambda_{Individual})}{P(X^i \mid \lambda_{Others})}$$

by applying pre-generated GMMs $\lambda_{Individual}$ and $\lambda_{others}$ to the extracted feature vector sequence $X^i$.

14. The target speech extraction method of claim 7, wherein, when additional information representing that the target speech is a speech of a specific property A (Property_A) is provided, the $LLR_i$ is calculated as expressed by $$LLR_i = \log\frac{P(X^i \mid \lambda_{Property\_A})}{P(X^i \mid \lambda_{Property\_B})}$$

by applying pre-generated GMMs λproperty_A and λproperty_B to the extracted feature vector sequence $X^i$.

15. The target speech extraction method of claim 7, wherein the extracting of the target speech comprises:
in a case where the additional information for the target speech is not provided, performing primary speech recognition for the separated sound-source signals by using an HMM (hidden Markov model) as a speech-recognition acoustic model;
calculating a closest HMM and a state column thereof for a sequence of the words obtained through the speech recognition;
calculating $LLR_i$ by using the HMMs;
calculating a maximum value by using the calculated LLRi;
comparing the maximum value with a predetermined threshold value; and
determining the maximum value to be the target speech if the maximum value is larger than the threshold value.

16. The target speech extraction method of claim 15, wherein the $LLR_i$ is calculated by using the following Equation:

$$\begin{aligned}LLR_i &= \log\frac{P(X^i \mid W)}{P(X^i \mid \overline{W})} \\ &= \log\frac{\prod_t P(x_t^i \mid s_j^m)}{\prod_t P(x_t^i \mid \overline{s}_j^m)} \\ &= \sum_t \log\frac{P(x_t^i \mid s_j^m)}{P(x_t^i \mid \overline{s}_j^m)} \\ &\cong \sum_t \log P(x_t^i \mid s_j^m) - \\ &\quad \log\left[\frac{1}{K-1}\sum_{\substack{k=1 \\ k\neq m}}^{K} \exp(\gamma\log P[x_t^i \mid s_j^k])\right]^{1/\gamma}\end{aligned}$$

wherein, w denotes a sequence of the words obtained from the speech recognition unit 130, $\overline{w}$ denotes a complement of the w, $\overline{s}_j^m$ denotes a complement of the $s^m{}_j$, K is the number of the states included in all the HMMs corresponding to $\overline{w}$, γ is a constant term which can be determined experimentally.

* * * * *